United States Patent
Laredo

(10) Patent No.: US 8,293,858 B1
(45) Date of Patent: Oct. 23, 2012

(54) OPHTHALMIC AND OTORHINOLARYNGOLOGICAL DEVICE MATERIALS CONTAINING A REACTIVE NVP MACROMER

(75) Inventor: Walter R. Laredo, Fort Worth, TX (US)

(73) Assignee: Novartis AG, Basel (CH)

( * ) Notice: Subject to any disclaimer, the term of this patent is extended or adjusted under 35 U.S.C. 154(b) by 322 days.

(21) Appl. No.: 12/687,277

(22) Filed: Jan. 14, 2010

Related U.S. Application Data

(60) Provisional application No. 61/144,518, filed on Jan. 14, 2009.

(51) Int. Cl.
C08F 220/30 (2006.01)
C08F 26/08 (2006.01)
(52) U.S. Cl. ....................................................... 526/264
(58) Field of Classification Search .................... 526/264
See application file for complete search history.

(56) References Cited

U.S. PATENT DOCUMENTS

| | | | |
|---|---|---|---|
| 5,290,892 A | | 3/1994 | Namdaran et al. |
| 5,331,073 A | | 7/1994 | Weinschenk, III et al. |
| 5,364,918 A | * | 11/1994 | Valint et al. ............... 526/245 |
| 5,470,932 A | * | 11/1995 | Jinkerson ................... 526/312 |
| 5,603,774 A | | 2/1997 | LeBoeuf et al. |
| 5,693,095 A | | 12/1997 | Freeman et al. |
| 5,969,076 A | | 10/1999 | Lai et al. |
| 6,353,069 B1 | * | 3/2002 | Freeman et al. ............ 526/319 |
| 6,465,593 B2 | | 10/2002 | LeBoeuf |
| 6,528,602 B1 | | 3/2003 | Freeman et al. |
| 6,653,422 B2 | | 11/2003 | Freeman et al. |
| 6,822,016 B2 | | 11/2004 | McCabe et al. |
| 7,157,538 B2 | | 1/2007 | Callaghan et al. |
| 2006/0069235 A1 | | 3/2006 | Arnold et al. |
| 2006/0072069 A1 | * | 4/2006 | Laredo et al. ............. 351/160 H |
| 2007/0299206 A1 | | 12/2007 | Cooper et al. |
| 2007/0299210 A1 | | 12/2007 | Kulshrestha et al. |
| 2008/0003252 A1 | | 1/2008 | Lai et al. |
| 2009/0023835 A1 | | 1/2009 | Freeman |
| 2009/0043006 A1 | | 2/2009 | Freeman |
| 2009/0088493 A1 | | 4/2009 | Laredo et al. |
| 2009/0088544 A1 | | 4/2009 | Laredo |
| 2009/0093604 A1 | | 4/2009 | Schlueter |
| 2009/0281209 A1 | | 11/2009 | Lehman et al. |

FOREIGN PATENT DOCUMENTS

WO 2007149804 A2 12/2007

* cited by examiner

Primary Examiner — Ling Choi
Assistant Examiner — Chun-Cheng Wang
(74) Attorney, Agent, or Firm — Patrick M. Ryan

(57) ABSTRACT

Disclosed are soft, high refractive index, acrylic device materials. The materials contain a reactive macromer based on N-vinyl pyrrolidone.

13 Claims, No Drawings

OPHTHALMIC AND OTORHINOLARYNGOLOGICAL DEVICE MATERIALS CONTAINING A REACTIVE NVP MACROMER

CROSS-REFERENCE TO RELATED APPLICATIONS

This application claims priority under 35 U.S.C. §119 to U.S. Provisional Patent Application No. 61/144,518, filed Jan. 14, 2009, the entire contents of which are incorporated herein by reference.

FIELD OF THE INVENTION

This invention is directed to improved ophthalmic and otorhinolaryngological device materials. In particular, this invention relates to soft, high refractive index acrylic device materials that comprise a reactive macromer based on N-vinyl pyrrolidone.

BACKGROUND OF THE INVENTION

With the recent advances in small-incision cataract surgery, increased emphasis has been placed on developing soft, foldable materials suitable for use in artificial lenses. In general, these materials fall into one of three categories: hydrogels, silicones, and acrylics.

In general, hydrogel materials have a relatively low refractive index, making them less desirable than other materials because of the thicker lens optic necessary to achieve a given refractive power. Conventional silicone materials generally have a higher refractive index than hydrogels, but tend to unfold explosively after being placed in the eye in a folded position. Explosive unfolding can potentially damage the corneal endothelium and/or rupture the natural lens capsule. Acrylic materials are desirable because they typically have a high refractive index and unfold more slowly or controllably than conventional silicone materials.

U.S. Pat. No. 5,290,892 discloses high refractive index, acrylic materials suitable for use as an intraocular lens ("IOL") material. These acrylic materials contain, as principal components, two aryl acrylic monomers.

The IOLs made of these acrylic materials can be rolled or folded for insertion through small incisions.

U.S. Pat. No. 5,331,073 also discloses soft acrylic IOL materials. These materials contain as principal components, two acrylic monomers which are defined by the properties of their respective homopolymers. The first monomer is defined as one in which its homopolymer has a refractive index of at least about 1.50. The second monomer is defined as one in which its homopolymer has a glass transition temperature less than about 22° C. These IOL materials also contain a cross-linking component. Additionally, these materials may optionally contain a fourth constituent, different from the first three constituents, which is derived from a hydrophilic monomer. These materials preferably have a total of less than about 15% by weight of a hydrophilic component.

U.S. Pat. No. 5,693,095 discloses foldable, high refractive index ophthalmic lens materials containing at least about 90 wt. % of only two principal components: one aryl acrylic hydrophobic monomer and one hydrophilic monomer. The aryl acrylic hydrophobic monomer has the formula

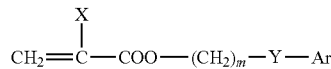

wherein:
X is H or CH$_3$;
m is 0-6;
Y is nothing, O, S, or NR, wherein R is H, CH$_3$, C$_n$H$_{2n+1}$ (n=1-10), iso-OC$_3$H$_7$, C$_6$H$_5$, or CH$_2$C$_6$H$_5$; and
Ar is any aromatic ring which can be unsubstituted or substituted with CH$_3$, C$_2$H$_5$, n-C$_3$H$_7$, iso-C$_3$H$_7$, OCH$_3$, C$_6$H$_{11}$, Cl, Br, C$_6$H$_5$, or CH$_2$C$_6$H$_5$.

The lens materials described in the '095 patent preferably have a glass-transition temperature ("T$_g$") between about −20 and +25° C.

Flexible intraocular lenses may be folded and inserted through a small incision. In general, a softer material may be deformed to a greater extent so that it can be inserted through an increasingly smaller incision. Soft acrylic or methacrylic materials typically do not have an appropriate combination of strength, flexibility and non-tacky surface properties to permit IOLs to be inserted through an incision as small as that required for silicone IOLs.

Polyethylene glycol (PEG) dimethacrylates are known to improve glistening resistance of hydrophobic acrylic formulations. See, for example, U.S. Pat. Nos. 5,693,095; 6,528,602; 6,653,422; and 6,353,069. Both the concentration and molecular weight of PEG dimethacrylates have an impact on glistening performance.

SUMMARY OF THE INVENTION

Improved soft, foldable acrylic device materials which are particularly suited for use as IOLs, but which are also useful as other ophthalmic or otorhinolaryngological devices, such as contact lenses, keratoprostheses, corneal rings or inlays, otological ventilation tubes and nasal implants, have been discovered. These polymeric materials comprise a reactive macromer based on N-vinyl pyrrolidone.

Among other factors, the present invention is based on the finding that use of a reactive macromer based on N-vinyl pyrrolidone in acrylic intraocular lens formulations reduces or eliminates temperature-induced glistening formation in hydrophobic acrylic copolymers and reduces surface tack. The subject monomers allow synthesis of glistening resistant, low equilibrium water content, high refractive index IOLs.

DETAILED DESCRIPTION OF THE INVENTION

Unless indicated otherwise, all component amounts are presented on a % (w/w) basis ("wt. %").

The device materials of the present invention are copolymers comprising a) a monofunctional acrylate or methacrylate monomer [1], b) a difunctional acrylate or methacrylate cross-linker [2], and c) a reactive macromer based on N-vinyl pyrrolidone [3]. The device materials may contain more than one monomer [1], more than one monomer [2], and more than one monomer [3]. Unless indicated otherwise, references to each ingredient are intended to encompass multiple monomers of the same formula and references to amounts are intended to refer to the total amount of all monomers of each formula.

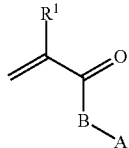

[1]

wherein
B=$O(CH_2)_n$, $NH(CH_2)_n$, or $NCH_3 (CH_2)_n$;
$R^1$=H, $CH_3$, $CH_2CH_3$, or $CH_2OH$;
n=0-12;
A=$C_6H_5$ or $O(CH_2)_mC_6H_5$, where the $C_6H_5$ group is optionally substituted with —$(CH_2)_nH$, —$O(CH_2)_nH$, —$CH(CH_3)_2$, —$C_6H_5$, —$OC_6H_5$, —$CH_2C_6H_5$, F, Cl, Br, or I; and
m=0-22;

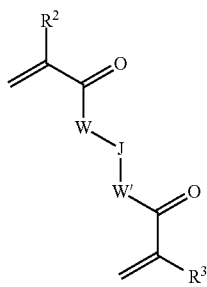

[2]

wherein
$R^2$, $R^3$ independently=H, $CH_3$, $CH_2CH_3$, or $CH_2OH$;
W, W' independently=$O(CH_2)_d$, $NH(CH_2)_d$, $NCH_3(CH_2)_d$, $O(CH_2)_dC_6H_4$, $O(CH_2CH_2O)_dCH_2$, $O(CH_2CH_2CH_2O)_dCH_2$, $O(CH_2CH_2CH_2CH_2O)_dCH_2$, or nothing;
J=$(CH_2)_a$, $O(CH_2CH_2O)_b$, O, or nothing, provided that if W and W'=nothing, then J≠nothing;
d=0-12;
a=1-12;
b=1-24;

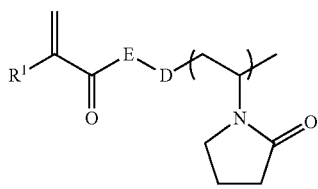

[3]

wherein:
D=$OCH_2CH_2S$, $SCH_2C$=O, $CH_3CH(O)CH_2S$, $SCH_2CH(OH)CH_2O$, $S(CH_2)_{11}O$, $S(CH_2)_{10}C$=O, $S(CH_2)_{14}C$=O, $S(CH_2)_{15}C$=O, $SC_6H_4CH_2O$, $CH_3CH(S)C$=O, $S(CH_2CH_2CH_2)O$, $CH_3CH(S)CH(O)CH_3$, $OCH_2CH_2C(CH_3)_2S$, $SCH_2CH_2C$=O, $S(CH_2)_4O$, $SC_6H_4CH_2$=O, $SC_6H_4C$=O, $S(CH_2)_{11}C$=O, $CH_3CH(O)CH(S)CH_3$, $SC_6H_4C$=O, $S(CH_2)_6OC_6H_4CH_2O$, $S(CH_2)_6O$, $S(CH_2)_5C$=O, $S(CH_2)_7C$=O, or $S(CH_2)_9O$;

E=nothing, $O(CH_2)_nNH$, $O(CH_2)_nNHC$=O, or $HN(CH_2)_n NH$;
n=2-12;
$R^1$=H, $CH_3$, $CH_2CH_3$, or $CH_2OH$; and
p=10-100.
Preferred monomers of formula [1] are those wherein:
B=$O(CH_2)_n$;
$R^1$=H or $CH_3$;
n=1-4; and
A=$C_6H_5$.
Preferred monomers of formula [2] are those wherein:
$R^2$, $R^3$ independently=H or $CH_3$;
W, W' independently=$O(CH_2)_d$, $O(CH_2)_dC_6H_4$, or nothing;
J=$O(CH_2CH_2O)_b$ or nothing, provided that if W and W'=nothing,
then J≠nothing;
d=0-6; and
b=1-10.
Preferred macromers of formula [3] are those wherein:
D=$OCH_2CH_2S$, $CH_3CH(O)CH_2S$, $SCH_2CH(OH)CH_2O$, $S(CH_2)_{11}O$, $SC_6H_4CH_2O$, $S(CH_2CH_2CH_2)O$, $CH_3CH(S)CH(O)CH_3$, $OCH_2CH_2C(CH_3)_2S$, $S(CH_2)_4O$, $CH_3CH(O)CH(S)CH_3$, $S(CH_2)_6OC_6H_4CH_2O$, $S(CH_2)_6O$, or $S(CH_2)_9O$;
E=nothing or $O(CH_2)_2NHC$=O;
$R^1$=H, $CH_3$, $CH_2CH_3$, or $CH_2OH$; and
p=10-75.
Most preferred monomers of formulas [3] are those wherein
D=$OCH_2CH_2S$, $S(CH_2CH_2CH_2)O$, $SCH_2CH(OH)CH_2O$, $SC_6H_4CH_2O$, $S(CH_2)_4O$, or $S(CH_2)_6OC_6H_4CH_2O$;
E=nothing;
$R^1$=H or $CH_3$; and
p=10-50.
Monomers of formula [1] are known and can be made by known methods. See, for example, U.S. Pat. Nos. 5,331,073 and 5,290,892. Many monomers of formula [1] are commercially available from a variety of sources. Preferred monomers of formula [1] include benzyl methacrylate; 2-phenylethyl methacrylate; 3-phenylpropyl methacrylate; 4-phenylbutyl methacrylate; 5-phenylpentyl methacrylate; 2-phenoxyethyl methacrylate; 2-(2-phenoxyethoxy)ethyl methacrylate; 2-benzyloxyethyl methacrylate; 2-(2-(benzyloxy)ethoxy)ethyl methacrylate; and 3-benzyloxypropyl methacrylate; and their corresponding acrylates.

Monomers of formula [2] are known and can be made by known methods, and are commercially available. Preferred monomers of formula [2] include ethylene glycol dimethacrylate ("EGDMA"); diethylene glycol dimethacrylate; triethylene glycol dimethacrylate; 1,6-hexanediol dimethacrylate; 1,4-butanediol dimethacrylate; 1,4-benzenedimethanol dimethacrylate; and their corresponding acrylates. Most preferred is 1,4-butanediol diacrylate.

Macromers of formula [3] are low molecular weight reactive macromers based on N-vinyl pyrrolidone (NVP macromers) with number average molecular weight (Mn) of 500 to 10,000 Daltons, more preferably 1,000 to 8,000 Daltons, and most preferably 2,000 to 8,000 Daltons. In one embodiment, the macromer of formula [3] has a Mn of 3,000 to 7,000. In another embodiment, the macromer of formula [3] has a Mn of 5,000-8,000. As used herein, "macromer" is a low molecular weight polymer having at least one polymerizable end group and a degree of polymerization (DP) ranging from 10 to 100 monomeric repeat units, which correspond to a number average molecular weight range from approximately 1000 to approximately 10,000 Daltons. Reactive NVP macromers with molecular weights greater than 10,000 typically are generally unsuitable because they result in device materials that are not optically clear or exhibit haze when equilibrated in water at higher temperatures followed by cooling to ambient temperature. The molecular weights for macromers having a molecular weight greater than about 1000 Daltons and less than about 10,000 Daltons may be determined by gel permeation chromatography (GPC) {size exclusion chromatography (SEC)} using THF as solvent, and relate to polystyrene calibration standards.

Macromers of formula [3] can be made by known methods. For example, the reactive macromer is synthesized using conventional initiators with or without chain transfer agents (CTAs). In a preferred embodiment, the chain transfer agent and initiator contain hydroxyl, carboxylic acid, or amino groups, resulting in hydroxyl-, carboxylic acid-, or amino-terminated intermediates that can be further functionalized with polymerizable end groups as previously mentioned.

The copolymeric materials of the present invention contain a total amount of monomer [1] from 75 to 97%, preferably from 80 to 95%, and most preferably from 80-93%. The difunctional cross-linker [2] concentration is generally present in an amount from 0.5-3%, and preferably 1-2%.

The materials of the present invention have at least one monomer [3]. The total amount of macromer [3] depends on the desired physical properties for the device materials. The copolymeric materials of the present invention contain a total of at least 1% and can contain as much as 8% of monomer [3]. Preferably, the copolymeric device materials will contain from 2 to 7% of monomer [3]. Most preferably, the device materials will contain from 2 to 6% of monomer [3].

The copolymeric device material of the present invention optionally contains one or more ingredients selected from the group consisting of a polymerizable UV absorber and a polymerizable colorant. Preferably, the device material of the present invention contains no other ingredients besides the monomers of formulas [1] and [2], the monomer [3], and the optional polymerizable UV absorbers and colorants.

The device material of the present invention optionally contains reactive UV absorbers or reactive colorants. Many reactive UV absorbers are known. A preferred reactive UV absorber is 2-(2'-hydroxy-3'-methallyl-5'-methylphenyl)benzotriazole, commercially available as o-Methallyl Tinuvin P ("oMTP") from Polysciences, Inc., Warrington, Pa. UV absorbers are typically present in an amount from about 0.1-5%. Suitable reactive blue-light absorbing compounds include those described in U.S. Pat. No. 5,470,932. Blue-light absorbers are typically present in an amount from about 0.01-0.5%. When used to make IOLs, the device materials of the present invention preferably contain both a reactive UV absorber and a reactive colorant.

In order to form the device material of the present invention, the chosen ingredients [1], [2], and [3], along with any of the optional ingredients, are combined and polymerized using a radical initiator to initiate polymerization by the action of either heat or radiation. The device material is preferably polymerized in de-gassed polypropylene molds under nitrogen or in glass molds.

Suitable polymerization initiators include thermal initiators and photoinitiators. Preferred thermal initiators include peroxy free-radical initiators, such as t-butyl (peroxy-2-ethyl) hexanoate and di-(tert-butylcyclohexyl) peroxydicarbonate (commercially available as Perkadox®16 from Akzo Chemicals Inc., Chicago, Ill.). Particularly in cases where the materials of the present invention do not contain a blue-light absorbing chromophore, preferred photoinitiators include benzoylphosphine oxide initiators, such as 2,4,6-trimethyl-benzoyldiphenyl-phosphine oxide, commercially available as Lucirin® TPO from BASF Corporation (Charlotte, N.C.). Initiators are typically present in an amount equal to about 5% or less of the total formulation weight, and more preferably less than 2% of the total formulation. As is customary for purposes of calculating component amounts, the initiator weight is not included in the formulation weight % calculation.

The particular combination of the ingredients described above and the identity and amount of any additional components are determined by the desired properties of the finished device material. In a preferred embodiment, the device materials of the present invention are used to make IOLs having an optic diameter of 5.5 or 6 mm that are designed to be compressed or stretched and inserted through surgical incision sizes of 2 mm or less. For example, the monomer [3] is combined with at least one mono-functional acrylate or methacrylate monomer [1] and a multifunctional acrylate or methacrylate cross-linker [2] and copolymerized using a radical initiator in a suitable lens mold.

The device material preferably has a refractive index in the hydrated state of at least about 1.50, and more preferably at least about 1.53, as measured by an Abbe' refractometer at 589 nm (Na light source) and 25° C. Optics made from materials having a refractive index lower than 1.50 are necessarily thicker than optics of the same power which are made from materials having a higher refractive index. As such, IOL optics made from materials with comparable mechanical properties and a refractive index lower than about 1.50 generally require relatively larger incisions for IOL implantation.

The proportions of the monomers to be included in the copolymers of the present invention should be chosen so that the copolymer has a glass transition temperature ($T_g$) not greater than about 37° C., which is normal human body temperature. Copolymers having glass transition temperatures higher than 37° C. are not suitable for use in foldable IOLs; such lenses could only be rolled or folded at temperatures above 37° C. and would not unroll or unfold at normal body temperature. It is preferred to use copolymers having a glass transition temperature somewhat below normal body temperature and no greater than normal room temperature, e.g., about 20-25° C., in order that IOLs made of such copolymers can be rolled or folded conveniently at room temperature. $T_g$ is measured by differential scanning calorimetry at 10° C./min., and is determined at the midpoint of the transition of the heat flux curve.

For IOLs and other applications, the materials of the present invention must exhibit sufficient strength to allow devices made of them to be folded or manipulated without fracturing. Thus the copolymers of the present invention will have an elongation of at least 80%, preferably at least 100%, and most preferably between 110 and 200%. This property indicates that lenses made of such materials generally will not crack, tear or split when folded. Elongation of polymer samples is determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at ambient conditions using an Instron Material Tester (Model No. 4442 or equivalent) with a 50 Newton load cell. The grip distance is set at 14 mm and a crosshead speed is set at 500 mm/minute and the sample is pulled until failure. The elongation (strain) is reported as a fraction of the displacement at failure to the original grip distance. Since the materials to be tested are essentially soft elastomers, loading them into the Instron machine tends to make them buckle. To remove the slack in the material sample a pre-load is placed upon the sample. This helps to reduce the slack and provide a more consistent reading. Once the sample is pre-loaded to a desired value (typically 0.03 to 0.05 N) the strain is set to zero and the test begun. The modulus is calculated as the instantaneous slope of the stress-strain curve at 0% strain ("Young's modulus"), 25% strain ("25% modulus") and 100% strain ("100% modulus).

IOLs made of the ophthalmic device materials of the present invention are more resistant to glistenings than other materials. Glistenings are measured according to the following test. The presence of glistenings is measured by placement of a lens or disk sample into a vial or sealed glass chamber and adding deionized water or a balanced salt solution. The vial or glass chamber is then placed into a water bath preheated to 41° C. Samples are to be maintained in the bath for a minimum of 16 hours and preferably 24±2 hours. The vial or glass chamber is then immediately placed in a water bath preheated to 35° C. and allowed to equilibrate at 35° C. for a minimum of 30 minutes and preferably 30 to 60 minutes. The sample is inspected visually in various on angle or off angle lighting to evaluate clarity while at 35° C. Visualization of glistenings is carried out at 35° C. with light microscopy using a magnification of 50 to 200×. A sample is judged to have many glistenings if, at 50-200× magnification, there are approximately 50 to 100% as many glistenings as observed in control samples based on 65 weight % PEA, 30 weight % PEMA, 3.2 weight % BDDA, and 1.8 weight % OMTP. Similarly, a sample is judged to have few glistenings if there are approximately 10% or more glistenings relative to the quantity observed in control samples. A sample is judged to have very few glistenings if there are approximately 1% or more glistenings relative to a control sample. A sample is judged to be free of glistenings if the number of glistenings detected in the eyepiece is zero. A sample is judged to be substantially free of glistenings if the number of glistenings detected in the eyepiece is less than about $2/mm^3$. It is often very difficult to detect glistenings, especially at surfaces and edges where more defects and debris have formed, so the sample is rastered throughout the entire volume of the lens, varying the magnification levels (50-200×), the aperture iris diaphragm, and the field conditions (using both bright field and dark field conditions) in an attempt to detect the presence of glistenings.

The copolymers of the present invention preferably have an equilibrium water content (EWC) of 0.5 to 3 weight %. EWC is measured by placing one rectangular 0.9×10×20 mm slab in a 20 ml scintillation vial filled with deionized water and subsequently heating in a 35° C. water bath for a minimum of 20 hours and preferably 48±8 hours. The slab is blotted dry with lens paper and the % water content is calculated as follows:

$$\% \text{ water content} = \frac{(\text{wet weight} - \text{dry weight})}{\text{wet weight}} \times 100$$

IOLs constructed of the device materials of the present invention can be of any design capable of being stretched or compressed into a small cross section that can fit through a 2-mm incision. For example, the IOLs can be of what is known as a one-piece or multi-piece design, and comprise optic and haptic components. The optic is that portion which serves as the lens and the haptics are attached to the optic and are like arms that hold the optic in its proper place in the eye. The optic and haptic(s) can be of the same or different material. A multi-piece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the materials of the present invention are also suitable for use as other ophthalmic or otorhinolaryngological devices such as contact lenses, keratoprostheses, corneal inlays or rings, otological ventilation tubes and nasal implants.

The invention will be further illustrated by the following examples, which are intended to be illustrative, but not limiting.

The following abbreviations are used throughout the Examples and have the following meanings.

| | |
|---|---|
| PEA | 2-phenylethyl acrylate |
| PEMA | 2-phenylethyl methacrylate |
| BzA | benzyl acrylate |
| BDDA | 1,4-butanediol diacrylate |
| THF | tetrahydrofuran |
| AIBN | azobisisobutyronitrile |
| OMTP | 2-(2H-benzo[d][1,2,3]triazol-2-yl)-4-methyl-6-(2-methylallyl)phenol |

Example 1

Synthesis of 3000 Mn Hydroxyl Terminated NVP (NVP-OH)

1-vinylpyrrolidin-2-one (21.8 g, 196 mmol) (Aldrich, Milwaukee, Wis., distilled), 2-mercaptoethanol (0.564 g, 7.22 mmol) (Sigma-Aldrich, Milwaukee, Wis.), and 2,2'-(2,2'-(2,2'-(diazene-1,2-diyl)bis(propane-2,2-diyl))bis(1H-imidazole-2,1(4H,5H)-diyl))diethanol (0.773 g, 1.88 mmol) (synonym=VA-060, Wako Specialty Chemicals) were dissolved in 200 ml isopropyl alcohol in a 250 ml round bottom flask equipped with magnetic stirrer and nitrogen inlet. The reaction mixture was purged with nitrogen for 30 minutes and then heated to 82° C. for 16 hours. The polymer was precipitated into diethyl ether 3 times to yield 13 g (64%) of a white solid.

Example 2

Synthesis of 3000 Mn Acrylate Terminated NVP (NVP-Acrylate)

NVP-OH (7.44 g, 3.72 mmol) from Example 1 and 50 mg 4-methoxyphenol (Aldrich) were dissolved in a solution of 200 ml anhydrous THF and 50 ml chloroform. Triethylamine (4.5 g, 45 mmol) (Sigma-Aldrich, >99.5%) was added and the reaction mixture was cooled to 0° C. Acryloyl chloride (1.47 g, 16.2 mmol) (Aldrich, 96%) was syringed into the reaction mixture dropwise and the mixture was allowed to stir at 0° C. for 1 hour, ambient temperature for 1 hour, and then 60° C. for 4 hours. The solvent was removed via rotary evaporation and the polymer was isolated by precipitation into diethyl ether 3 times to yield 6.5 g (73%) of an off-white solid.

Example 3

Synthesis of 3000 Mn Methacrylate Terminated NVP (NVP-Methacrylate)

NVP-OH (9.1 g, 4.5 mmol) from Example 1 and 50 mg 4-methoxyphenol were dissolved in a solution of 200 ml anhydrous THF+50 ml chloroform. Triethylamine (5.5 g, 55 mol) was added and the reaction mixture was cooled to 0° C. Methacryloyl chloride (2.0, 19 mmol) (Alfa Aesar, 97%) was added dropwise to the reaction mixture and the mixture was allowed to stir at 0° C. for 1 hour, ambient temperature for 1 hour, and 60° C. for 4 hours. The solvent was removed via rotary evaporation and the polymer was isolated by precipitation into diethyl ether 3 times to yield 7.6 g (70%) of an off-white solid.

Example 4

Synthesis of 2000 Mn Hydroxyl Terminated NVP (NVP-OH)

1-vinylpyrrolidin-2-one (20.5 g, 184 mmol), 2-mercaptoethanol (0.823 g, 10.5 mmol), and 2,2'-(2,2'-(2,2'-(diazene-1,2-diyl)bis(propane-2,2-diyl))bis(1H-imidazole-2,1(4H,5H)-diyl))diethanol (0.218 g, 0.529 mmol) were dissolved in 300 ml isopropyl alcohol in a 500 ml round bottom flask equipped with magnetic stirrer and nitrogen inlet. The reaction mixture was purged with nitrogen for 30 minutes and then heated to 82° C. for 20 hours. The polymer was isolated by precipitation in diethyl ether 3 times to yield 13 g (61%) of a white solid.

Example 5

Synthesis of 2000 Mn Methacrylate Terminated NVP (NVP-Methacrylate)

NVP-OH (9.0 g, 4.5 mmol) from Example 4 and 50 mg 4-methoxyphenol were dissolved in 60 ml anhydrous pyridine (Burdick & Jackson). Methacrylic anhydride (2.8 g, 18 mmol) (Alfa Aesar, 94%) was added dropwise to the reaction mixture and the mixture was stirred at 60° C. for 22 hours. The polymer was isolated by precipitation into diethyl ether 3 times to yield 5.7 g (54%) of an off-white solid.

Example 6

Lens Materials

The NVP macromers of Examples 2, 3 and 5 were formulated as shown in Tables 1 and 2. Test samples measuring 0.9 mm in thickness were thermally cured at 70° C. for 1 hour and 110° C. for 2 hours. Samples were extracted in acetone for 20 hours and then dried slowly at ambient temperature for 40 hours, followed by vacuum (0.1 mm Hg) for a minimum of 20 hours at 70° C.

Percent extractables, equilibrium water content (EWC), refractive index (R.I.), and slab appearance of hydrated samples subjected to a change in temperature test (Delta T Test) are shown in Table 3. Mechanical and thermal properties of select compositions are shown in Table 4.

TABLE 1

| Component | Example (% w/w) | | | |
|---|---|---|---|---|
| | 6A | 6B | 6C | 6D |
| Ex 2 | 0 | 2.03 | 4.09 | 8.07 |
| BzA | 0 | 96.2 | 94.0 | 90.0 |
| PEA | 65.0 | 0 | 0 | 0 |
| PEMA | 30.0 | 0 | 0 | 0 |
| BDDA | 3.20 | 1.73 | 1.94 | 1.94 |

TABLE 1-continued

| Component | Example (% w/w) | | | |
|---|---|---|---|---|
| | 6A | 6B | 6C | 6D |
| OMTP | 1.81 | 0 | 0 | 0 |
| AIBN | 0.49 | 0.50 | 0.49 | 0.54 |

TABLE 2

| Component | Example (% w/w) | | | | | |
|---|---|---|---|---|---|---|
| | 6E | 6F | 6G | 6H | 6I | 6J |
| Ex 3 | 2.06 | 4.04 | 8.07 | 4.0 | 0 | 0 |
| Ex 5 | 0 | 0 | 0 | 0 | 0 | 3.97 |
| BzA | 0 | 0 | 0 | 92.7 | 96.7 | 92.2 |
| PEA | 64.8 | 63.5 | 60.9 | 0 | 0 | 0 |
| PEMA | 29.9 | 29.3 | 28.1 | 0 | 0 | 0 |
| BDDA | 3.19 | 3.13 | 3.00 | 1.50 | 1.49 | 2.00 |
| 3-(3-tert-butyl-4-hydroxy-5-(5-methoxy-2H-benzo[d][1,2,3]triazol-2-yl)phenoxy) propyl methacrylate | 0 | 0 | 0 | 1.80 | 1.83 | 1.79 |
| N-2-(3-(2-methyl-phenylazo)-4-hydroxyphenyl)ethyl-methylacrylamide | 0 | 0 | 0 | 0.021 | 0.021 | 0.020 |
| AIBN | 0.49 | 0.50 | 0.48 | 0.50 | 0.52 | 0.50 |

TABLE 3

| Example | % Extrac-tables | EWC (35° C.) (%) | EWC (45° C.) (%) | R.I. (35° C.) | Sample Appearance After Delta T Test | Glistenings Per Test Sample |
|---|---|---|---|---|---|---|
| 6A | 1.4 | 0.5 | — | — | [1]Clear | [1]Many |
| 6B | 1.5 | 0.5 | 0.7 | 1.560 | [1]Clear [2]Hazy | [1]Very few [2]Many |
| 6C | 2.0 | 1.2 | 1.3 | 1.557 | [1]Clear [2]Clear | [1]Zero [2]Zero to very few |
| 6D | 3.0 | 2.6 | 3.0 | 1.551 | [1]Clear [2]Clear | [1]Zero [2]Zero |
| 6E | 0.9 | — | — | — | [1]Hazy | — |
| 6F | 1.7 | — | — | — | [1]Hazy | — |
| 6G | 3.2 | — | — | — | [1]Hazy | — |
| 6H | 3.0 | 1.6 | 1.4 | 1.557 | [1]Clear [2]Clear | [1]Zero [2]Zero to very few |
| 6I | 1.3 | 0.5 | 0.4 | 1.561 | [1]Hazy [2]Hazy | [1]Many [2]Many |
| 6J | 3.0 | 0.9 | 0.6 | 1.557 | [1]Clear | [1]Zero |

[1]Sample was equilibrated in deionized water for 48 hours at 45° C., then cooled to ambient temperature and inspected by an optical microscope 1-2 hours later
[2]Sample was equilibrated in deionized water for a minimum of 2 weeks at 70° C., then cooled to ambient temperature and inspected by an optical microscope 1-2 hours later

TABLE 4

| Example | Stress At Break (MPa) | Strain At Break (%) | Young's Modulus (MPa) | 25% Secant Modulus (MPa) | 100% Secant Modulus (MPa) | Tg (1st heat) (° C.) | Tg (2nd heat) (° C.) |
|---|---|---|---|---|---|---|---|
| 6A | 6.5 | 91 | 38 | 9.3 | — | — | — |
| 6B | 8.5 | 155 | 67 | 10.7 | 4.6 | 12.9 | — |
| 6C | 9.7 | 139 | 90 | 13.8 | 6.2 | 13.9 | 13.2 |
| 6D | 10.6 | 112 | 144 | 21.1 | 9.4 | 14.3 | 13.9 |
| 6E | 8.1 | 96 | 55 | 11.6 | 8.6 | — | — |
| 6F | 8.7 | 94 | 55 | 12.3 | — | — | — |

TABLE 4-continued

| Example | Stress At Break (MPa) | Strain At Break (%) | Young's Modulus (MPa) | 25% Secant Modulus (MPa) | 100% Secant Modulus (MPa) | Tg (1st heat) (° C.) | Tg (2nd heat) (° C.) |
|---|---|---|---|---|---|---|---|
| 6G | 9.1 | 81 | 73 | 16.2 | — | — | — |
| 6H | 8.8 | 139 | 124 | 17.6 | 6.4 | — | — |
| 6I | 8.7 | 176 | 86 | 12.1 | 4.3 | — | — |
| 6J | | | | | | | |

Example 7

Tack Study

IOL materials from Example 6H were plasma-treated with argon gas according to the methods described in U.S. Pat. No. 5,603,774 and then sterilized. Tack was measured using a modified tensilometry test method. Tack results from Example 6H were compared to that of Example 6A (using Perkadox 16 as an initiator).

Tack Testing Procedure

Tack testing was conducted on an Instron mechanical tester using a custom fixture for measuring the metal-polymer tack or adhesion. The fixture includes a highly polished stainless steel circular stationary pin of 8 mm in diameter that is affixed to the stationary portion of the load frame. The upper (moveable) section of the load frame crosshead is attached to a circular metal platform with a hole in the center. The moveable crosshead is lowered until the bottom pin appears through the hole in the center of the upper fixture and the crosshead movement is stopped when the pin is slightly above the metal platform. The polymer sample is then placed on the protruding pin. A fresh 10 mm diameter disk is press cut from the polymer sample and is placed on top of the protruding pin. A 300 gram weight is placed on top of the sample, pressing the sample to the pin with a uniform load. One minute after placing the weight on the sample, the Instron mechanical tester is started with a separation rate of 5 mm/min. Data is collected at a rate of 5 points/sec until the sample is pulled up off of the pin. The maximum force and area under the curve (work energy) is recorded.

Results

Six samples of each material were tested for tack and the results averaged. The values are given in the Figures along with ±1 standard deviation bars.

The formulation with the PVP-MA additive results in lower tack values for both pre-plasma and post-plasma treatment (argon). The differences are statistically significant (p-value<0.10) at the 90% confidence level using T-test method.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

What is claimed is:

1. An intraocular lens comprising a polymeric device material, wherein the polymeric device material has an equilibrium water content of: 0.5 to 3 weight percent and is formed by polymerizing a composition comprising a) 75 to 97% (w/w) of a monofunctional monomer of formula [1]:

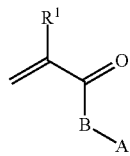

wherein
B=$O(CH_2)_n$, $NH(CH_2)_n$, or $NCH_3(CH_2)_n$;
$R^1$=H, $CH_3$, $CH_2CH_3$, or $CH_2OH$;
n=0-12;
A=$C_6H_5$ or $O(CH_2)_mC_6H_5$, where the $C_6H_5$ group is optionally substituted with —$(CH_2)_nH$, —$O(CH_2)_nH$, —$CH(CH_3)_2$, —$C_6H_5$, —$OC_6H_5$, —$CH_2C_6H_5$, F, Cl, Br, or I;
and
m=0-22;

b) a difunctional cross-linking monomer of formula [2]:

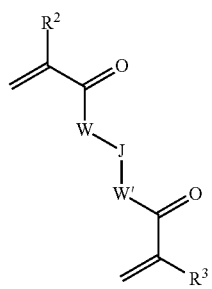

wherein
$R^2$, $R^3$ independently=H, $CH_3$, $CH_2CH_3$, or $CH_2OH$;
W, W' independently=$O(CH_2)_d$, $NH(CH_2)_d$, $NCH_3(CH_2)_d$, $O(CH_2)_dC_6H_4$, $O(CH_2CH_2O)_dCH_2$, $O(CH_2CH_2CH_2O)_dCH_2$, $O(CH_2CH_2CH_2CH_2O)_dCH_2$, or nothing;
J=$(CH_2)_a$, $O(CH_2CH_2O)_b$, O, or nothing, provided that if W and W'=nothing, then J≠nothing;
d=0-12;
a=1-12; and
b=1-24;
and c) 1 to 8% (w/w) of a macromer of formula [3]:

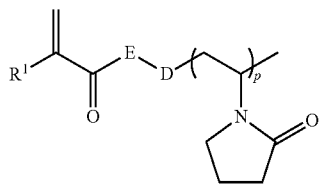

wherein:
D=$OCH_2CH_2S$, $SCH_2C$=O, $CH_3CH(O)CH_2S$, $SCH_2CH(OH)CH_2O$, $S(CH_2)_{11}O$, $S(CH_2)_{10}C$=O, $S(CH_2)_{14}$ C=O, $S(CH_2)_{15}C$=O, $SC_6H_4CH_2O$, $CH_3CH(S)$ C=O, $S(CH_2CH_2CH_2)O$, $CH_3CH(S)CH(O)CH_3$, $OCH_2CH_2C(CH_3)_2S$, $SCH_2CH_2C=O$, $S(CH_2)_4O$, $SC_6H_4CH_2C=O$, $SC_6H_4C=O$, $S(CH_2)_{11}C=O$, $CH_3CH(O)CH(S)CH_3$, $SC_6H_4C=O$, $S(CH_2)_6OC_6H_4CH_2O$, $S(CH_2)_6O$, $S(CH_2)_5C=O$, $S(CH_2)_7C=O$, or $S(CH_2)_9O$;

E=nothing, $O(CH_2)_n NH$, $O(CH_2)_n NHC=O$, or $HN(CH_2)_n NH$;

n=2-12;

$R^1$=H, $CH_3$, $CH_2CH_3$, or $CH_2OH$; and p=10-100.

2. The intraocular lens of claim 1 wherein $B=O(CH_2)_n$;

$R^1$=H or $CH_3$;

n=1-4; and $A=C_6H_5$.

3. The intraocular lens of claim 1 wherein $R^2$, $R^3$ independently=H or $CH_3$;

W, W' independently=$O(CH_2)_d$, $O(CH_2)_d C_6H_4$, or nothing;

J=$O(CH_2CH_2O)_b$ or nothing, provided that if W and W'=nothing, then J≠nothing;

d=0-6; and b=1-10.

4. The intraocular lens of claim 1 wherein

D=$OCH_2CH_2S$, $CH_3CH(O)CH_2S$, $SCH_2CH(OH)CH_2O$, $S(CH_2)_{11}O$, $SC_6H_4CH_2O$, $S(CH_2CH_2CH_2)O$, $CH_3CH(S)CH(O)CH_3$, $OCH_2CH_2C(CH_3)_2S$, $S(CH_2)_4O$, $CH_3CH(O)CH(S)CH_3$, $S(CH_2)_6OC_6H_4CH_2O$, $S(CH_2)_6O$, or $S(CH_2)_9O$;

E=nothing or $O(CH_2)_2NHC=O$;

$R^1$=H, $CH_3$, $CH_2CH_3$, or $CH_2OH$; and p=10-75.

5. The intraocular lens of claim 4 wherein

D=$OCH_2CH_2S$, $S(CH_2CH_2CH_2)O$, $SCH_2CH(OH)CH_2O$, $SC_6H_4CH_2O$, $S(CH_2)_4O$, or $S(CH_2)_6OC_6H_4CH_2O$;

E=nothing;

$R^1$=H or $CH_3$; and p=10-50.

6. The intraocular lens of claim 1 wherein the monomer of formula [1] is selected from the group consisting of benzyl methacrylate; 2-phenylethyl methacrylate; 3-phenylpropyl methacrylate; 4-phenylbutyl methacrylate; 5-phenylpentyl methacrylate; 2-phenoxyethyl methacrylate; 2-(2-phenoxyethoxy)ethyl methacrylate; 2-benzyloxyethyl methacrylate; 2-(2-(benzyloxy)ethoxy)ethyl methacrylate; 3-benzyloxypropyl methacrylate; benzyl acrylate; 2-phenylethyl acrylate; 3-phenylpropyl acrylate; 4-phenylbutyl acrylate; 5-phenylpentyl acrylate; 2-phenoxyethyl acrylate; 2-(2-phenoxyethoxy)ethyl acrylate; 2-benzyloxyethyl acrylate; 2-(2-(benzyloxy)ethoxy)ethyl acrylate; and 3-benzyloxypropyl acrylate.

7. The intraocular lens of claim 1 wherein the monomer of formula [2] is selected from the group consisting of ethylene glycol dimethacrylate; diethylene glycol dimethacrylate; triethylene glycol dimethacrylate; 1,6-hexanediol dimethacrylate; 1,4-butanediol dimethacrylate; 1,4-benzenedimethanol dimethacrylate; ethylene glycol diacrylate; diethylene glycol diacrylate; triethylene glycol diacrylate; 1,6-hexanediol diacrylate; 1,4-butanediol diacrylate; and 1,4-benzenedimethanol diacrylate.

8. The intraocular lens of claim 1 wherein the amount of monomer [1] is 80 to 95% (w/w).

9. The intraocular lens of claim 1 wherein the amount of monomer [2] is 0.5 to 3% (w/w).

10. The intraocular lens of claim 1 wherein the amount of monomer [3] is 2 to 7% (w/w).

11. The intraocular lens of claim 10 wherein the amount of monomer [3] is 2 to 6% (w/w).

12. The intraocular lens of claim 1 wherein the composition further comprises an ingredient selected from the group consisting of a polymerizable UV absorbers and a polymerizable colorants.

13. The intraocular lens of claim 12 wherein the composition comprises 0.1-5% (w/w) of a polymerizable UV absorber and 0.01-0.5% (w/w) of a polymerizable colorant.

* * * * *